United States Patent
Torkki et al.

(12) 
(10) Patent No.: US 6,636,742 B1
(45) Date of Patent: Oct. 21, 2003

(54) TRACKING OF MOBILE TERMINAL EQUIPMENT IN A MOBILE COMMUNICATIONS SYSTEM

(75) Inventors: Markus Torkki, Helsinki (FI); Tuomo Gröhn, Helsinki (FI)

(73) Assignee: Sonera Oyj, Helsinki (FI)

( * ) Notice: Subject to any disclaimer, the term of this patent is extended or adjusted under 35 U.S.C. 154(b) by 588 days.

(21) Appl. No.: 09/599,201

(22) Filed: Jun. 22, 2000

Related U.S. Application Data

(63) Continuation of application No. PCT/FI98/01019, filed on Dec. 23, 1998.

(30) Foreign Application Priority Data

Dec. 23, 1997 (FI) .................................................. 974630

(51) Int. Cl.⁷ ................................................. H04Q 7/20
(52) U.S. Cl. ..................................... 455/456; 455/433
(58) Field of Search ................................. 455/422, 432, 455/433, 435, 456, 457, 461, 575

(56) References Cited

U.S. PATENT DOCUMENTS

| | | | |
|---|---|---|---|
| 5,432,841 A | | 7/1995 | Rimer |
| 5,583,916 A | * | 12/1996 | Maenpaa ..................... 455/433 |
| 5,787,357 A | * | 7/1998 | Salin ........................... 455/433 |
| 5,960,345 A | * | 9/1999 | Laatu .......................... 455/435 |
| 6,208,866 B1 | * | 3/2001 | Rouhollahzadeh et al. . 455/456 |
| 6,230,017 B1 | * | 5/2001 | Andersson et al. .......... 455/456 |

FOREIGN PATENT DOCUMENTS

| WO | WO 95/01066 | 1/1995 |
|---|---|---|
| WO | WO 97/24010 | 7/1997 |
| WO | WO 97/27711 | 7/1997 |

* cited by examiner

*Primary Examiner*—Quochien Vuong
(74) *Attorney, Agent, or Firm*—Cohen, Pontani, Lieberman & Pavane

(57) ABSTRACT

Drawbacks of known methods of location determination are that the location can be determined only when the mobile station is setting up a call and during the call. The invention utilises that characteristic feature of mobile telephone systems that the location of the terminal is always known to the system with location area precision and that the geographical network topology is known to the network planning system. The tracing system includes three functional parts: a first part provides the mobile telephone system with the connection number of the traced terminal as an enquiry input, and in response to the input it receives information on where the subscriber's location area should be enquired for. The second functional part asks for the subscriber's location area and receives in response a location area code, which identifies the location area unambiguously. The third functional part searches the location area table for information corresponding with the subscriber's location area and attends to reporting on the results. The location area table is formed on a basis of cell topology information which is available in advance from the network planning system, which converts the location area identity into an area name in plain language which is bound to a map. Enquiries may be made at desired intervals and the result may be stored in a tracing file. From this a report can be formed from which it is possible easy to find out the subscriber's movements with location area precision.

19 Claims, 7 Drawing Sheets

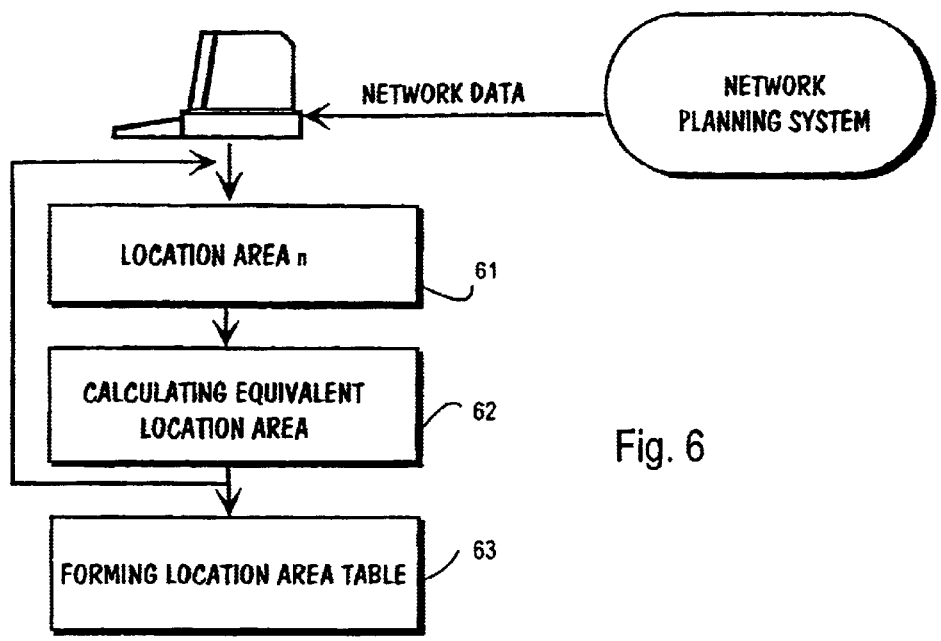
Fig. 6
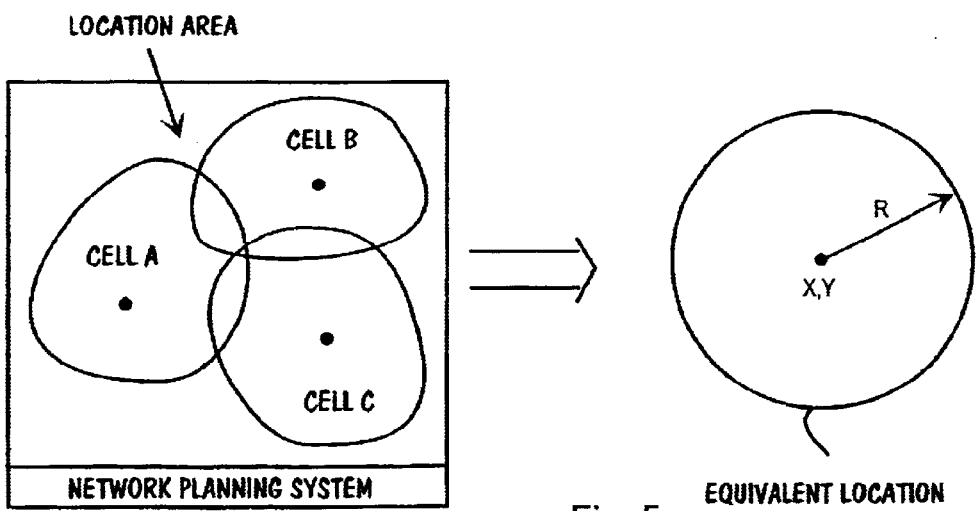
Fig. 5
| LOCATION AREA | COORDINATES | RADIUS | NAME |
|---|---|---|---|
| LAC 1 | X1,Y1 | R1 | SIPOO |
| LAC 2 | X2,Y2 | R2 | PORVOO |
| LAC 3 | X3,Y3 | R3 | ASKOLA |
| LAC 4 | X4,Y4 | R4 | |
| ⋮ | ⋮ | ⋮ | |
| LAC n | Xn,Yn | Rn | |
Fig. 7

TRACKING OF MOBILE TERMINAL EQUIPMENT IN A MOBILE COMMUNICATIONS SYSTEM

PRIORITY CLAIM

This is a continuation of International Application No. PCT/FI98/01019, filed on Dec. 23, 1998. Priority is claimed on that application and on the following application: Finland Application No. 974630, filed Dec. 23, 1997.

FIELD OF THE INVENTION

This invention concerns a method for determination of the location of terminal equipment in a cellular mobile communications system including several base transceiver stations and wherein the terminal equipment may move from one cell to another and from one traffic area to another during the traffic connection.

TECHNICAL BACKGROUND

When a terminal in a mobile telephone network is in a traffic or signalling connection with the network, information about the location and movement of the terminal equipment in the network has not been of primary importance in most cases. However, in some cases information about the location and movement of the terminal equipment is a desirable network operator service. One such case is e.g. when the authorities for some reason wish to trace the movement of a certain terminal in the network.

The following is a description of the structure and operation of a mobile telephone network using as an example the GSM mobile telephone network shown in FIG. 1. Other digital mobile telephone networks include the same network elements as those in the GSM network. Communication between the network and mobile station MS in the cell takes place via the radio path by way of base transceiver station BTS. Base transceiver stations BTS are connected to base station controller BSC. Several base transceiver stations BTS are usually under the control of one base station controller BSC and they can be chained to one another or cabled directly to the base station controller, as is illustrated in the figure. The geographical area covered by these base transceiver stations is called location area LA and the calls intended for the mobile stations in this area are sent through these base transceiver stations. FIG. 1 shows six location areas. The mobile station may move within the location area without any need to update the location data concerning the mobile station.

Several base station controllers are connected to one mobile switching centre MSC, which carries out the main switching functions of the mobile telephone network. In addition, it connects the mobile telephone network with external networks. The entity of location areas under the management of the mobile switching centre is called the switching centre area. In the figure, the switching centre area of the MSC 1 switching centre includes location areas a, b and c, while the switching centre area of the MSC 2 switching centre includes location areas d, e and f. All calls beginning from and ending in the switching centre area are relayed by way of the same mobile switching centre. If a mobile station network includes several mobile switching centres like switching centres MSC 1 and MSC 2 in the figure, their switching centre areas together form the system area of the mobile communications network, which means the geographical area covered by one network. The network is almost always run by one operator.

The mobile telephone network also includes various databases. Subscriber data is stored permanently in home location register HLR, irrespective of the current location of the subscriber. If the network is large and there are many subscribers, then several home location registers are used, in the figure these are HLR a, HLR b and HLR c respectively. The number space is divided to these registers, whereby the search for subscriber data is quicker. Visitor location register VLR is nowadays integrated with each mobile switching centre and the subscriber data fetched from the home location register is stored therein while the subscriber visits the area of the VLR, that is, the switching centre area. For example, in FIG. 1 subscriber data of a mobile station located in cell 1 is stored in home location register 5 connected to mobile switching centre MSC 1. Mobile station MS may move freely within the location area a without any need to update this data.

Location update is done every time when the subscriber connects to the network. When a subscriber e.g. in cell 1, FIG. 1, turns on his mobile station MS, it signals a location update request to base transceiver station 2, and the request is directed by way of base station controller 3 to mobile switching centre MSC 1 and further to visitor location register VLR indicated by reference number 5. The register asks the subscriber to send his subscriber code, from which the VLR learns the subscriber's home location register, which in this case is HLR a. Visitor location register VLR asks home location register HLR a to send the authentication parameters needed for the identification of the subscriber and for encrypting the connection. After a successful authentication of the subscriber, home location register HLR a knows that area of the visitor location register, that is, the mobile switching centre, in which the subscriber is located and it sends subscriber data to visitor location register 5 in question. The subscriber's location is now updated, that is, HLR knows the address of VLR 5, and VLR 5 knows the location area a, wherein the mobile station is located.

Location update is also done every time when a subscriber moves from one location area to another, e.g. when in FIG. 1 mobile station MS moves from location area 11 to location area 12. This update is done on the mobile station's initiative, which informs the visitor location register about the changed location area. If the location area belongs to the same switching centre area, that is, to the control of same visitor location register VLR, as in our example, then there is no need to change the address of visitor location register 5 which is stored in home location register HLR a. The address is changed only if the subscriber moves to another switching centre area, e.g. from location area c to location area d, whereby visitor location register 7 tells its address to home location register HLR a, and the home location register sends the subscriber data to visitor location register 7.

Location update can also be made periodically at certain intervals (Periodic Location Update). Hereby the location update is triggered off when the time counter in the mobile station is full.

Based on the above it is known that the home location register always knows the visitor location register connected to the mobile switching centre in whose mobile services switching centre area the subscriber is located, and the visitor location register knows in which location area the subscriber is located. The code of the location area is unambiguous. When the subscriber is moving in any network, this data is updated. This is also true in part, if the subscriber is moving in the network of such another operator, with whom the own operator has a roaming contract. In this case the only thing which the home location register knows about the subscriber is whose network the subscriber is registered with. In case of a foreign country, what is known is in which country and in which operator's network the subscriber is located.

System management is an important part of the mobile telephone system. In most cases the management function is centralised in an Operation & Maintenance Centre OMC, from which the configuration, management and testing of network elements and downloading of software etc. are performed by remote control and in a centralised manner. In the figure, the dashed lines beginning from operation and maintenance centre 8 and ending in network elements illustrate management connections. Another important mobile telephone system is the network planning system, which is used for computing the network topology when new cells are added, old ones are removed and cell sizes are changed. This network planning system knows the co-ordinates of base transceiver stations and the coverage areas of cells. Network planning can also be included in the system management.

Reference is now made to FIG. 2 and to FIGS. 3A–3B. FIG. 2 shows in a condensed manner that information essential for the invention which the different network elements have about the subscriber and which information is stored on the subscriber card of terminal equipment MS. The figure corresponds to FIG. 1 in that the area in question is the mobile services switching centre area of switching centre MSC 1, wherein there are three location areas. Each location area has its own location area identity LAI, which are here marked with letters a, b and c. The contents of the location area identity is shown in FIG. 3B. The identity consists of mobile network country code MCC, in Finland the code is 244, mobile network code MNC, which is an operator-specific parameter, and location area code LAC. The operator's location area identities thus differ from each other only as regards the LAC code. In Finland, the number of granted mobile network codes is 10 and e.g. the operator called Telecom Finland uses the MNC codes 91 and 92.

Location area identity LAI is in the memory of base station controller BSC of this area. When a mobile station is in some location area it has also received from the network this location area identity LAI and has stored it in its memory. Mobile subscriber international ISDN number MSISDN(telephone directory number) and International Mobile Subscriber Identity IMSI are stored on the mobile station's SIM card. When the mobile station has registered with the network, its location area identity LAI, its MSISDN telephone number and its IMSI code are stored in visitor location register VLR of switching centre MSC. It is not necessary to store the MSISDN number on the SIM card, but in connection with the location update the number is transferred from the home location register to the visitor location register together with the other subscriber parameters.

The visitor location register also contains a pool of so-called mobile station roaming numbers MSRN. This number is used when a call is coming to the mobile station. Hereby VLR's reply to HLR's enquiry about the subscriber's location is to take one MSRN from the pool, to give it temporarily as the subscriber's number and to send this number to the enquiring HLR. Based on the MSRN number the call can be routed through transit networks to this switching centre and, according to the characters of the final part of the subscriber number, further to the subscriber. Upon completion of the call the mobile station roaming number is released for reuse.

The contents of the MSISDN connection number are as shown in FIG. 3A. It contains country code CC, e.g. if a Swedish subscriber is in Finland, the country code is +358, national destination code NDC, which is the operator's routing code in practice and which in Finland is 40 in the network of the operator Telecom Finland, and the "subscriber number". The last number is subscriber number SN individualising the subscriber.

Based on the description in accordance with FIGS. 2 and 3A–3B, home location register HLR always stores the subscriber's connection number MSISDN, subscriber's international mobile subscriber identity IMSI and the address of that visitor location register VLR where the subscriber is located. Besides the subscriber's MSISDN and IMSI numbers, the visitor location register also stores the LAI identity and thus the LAC code of that location area where the subscriber happens to be at that moment. When MS is moving from location area a to location area b in FIG. 2, the LAC code is the only code that will change in the memories of the mobile telephone and the base station controller. No changes take place in the home location register.

Known mobile telephone systems offer a possibility to locate the terminal equipment. The location accuracy may be one cell. Hereby, when a mobile station starts a call or when a call is set up to a mobile station, the base transceiver station will from the call set-up message signalled by the mobile station learn the identity of the cell where the mobile telephone is camping. The mobile station for its part has received the identity from the broadcasting channel transmitted by the base transceiver station. The identity in the message may function as a triggering off to the intelligent network.

The location accuracy may also be less than one cell. Hereby the system must be such that also neighbour base transceiver stations will receive the mobile station's transmission, whereby the location can be figured out from the time differences between transmissions.

It is also possible to start such a programme in a mobile switching centre, which stores e.g. tracing data obtained during the call set-up in the disk memory, from which they can be read afterwards. This method will load the switching centre's memory very much, so there may not be very many pieces of terminal equipment to trace.

Drawbacks of the known location determination methods are that the location can be determined only when the mobile station is setting up a call and during the call. This means that the tracing data is deficient. When using an intelligent network it is difficult to route a call to the intelligent network's service switching point SSP.

The objective of this invention is a terminal tracing system which does not suffer from the drawbacks of known methods. It is an objective to be able to trace movement of the terminal in the network irrespective of whether it is in a traffic connection or in an idle state just listening to paging calls. It is a particular objective to utilise as much as possible the already existing features of the mobile telephone network.

The established objectives are achieved with the definitions presented in the independent claims.

BRIEF SUMMARY OF THE INVENTION

The invention utilises that feature of mobile telephone systems that the location of a terminal with location area precision is always known to the system and that the geographical network topology is known to the network planning system.

The tracing system includes three functional parts: the first part gives to the mobile telephone system as input enquiry the connection number of the terminal equipment to be traced and receives, as a response to the input enquiry, information on where to ask for the subscriber's location area. The second functional part enquires about the subscriber's location area and receives as a response the location area code which unambiguously identifies the location area. The third functional part fetches information corresponding to the subscriber's location area from the location area table and attends to reporting on the results.

Based on cell topology information obtained from the network planning system, a location area table has been set up in advance, which converts the location area identity into an area name which is in plain language and is bound to the map. The location area table preferably contains the following for each location area:

the location area identity in the form in which it is available from the network, an equivalent geographical location area computed from the real geographical location area which includes coverage of the cells of the area and the co-ordinates of the base transceiver stations of the cells, co-ordinates of the centre of gravity of the location area, a given suitable geographical name which is chosen by placing an equivalent location area on top of the geographical map containing the place names.

When the network gives the location area identity of the subscriber station as a response to the connection number, the tracing system will convert the identity into a geographical place name. Finally, the tracing system creates a record containing at least the subscriber connection number and the geographical place name where the subscriber is located.

Enquiries can be made at desired intervals and the result can be stored in a tracing file. From this a report can be formed, from which it is easy to find out the subscriber's movement with location area precision.

The report may be supplemented by adding such other desired information to it which the mobile telephone system produces naturally. Such information is at least the time of day and the date, whereby the terminal has done the location update.

BRIEF DESCRIPTION OF THE DRAWINGS

The invention is described with reference to the accompanied drawings, in which

FIG. 5 illustrates the formation of the equivalent location area;

FIG. 6 shows the formation of the location area table;

FIG. 7 shows a location area table;

DETAILED DESCRIPTION OF THE INVENTION

Figure 4:
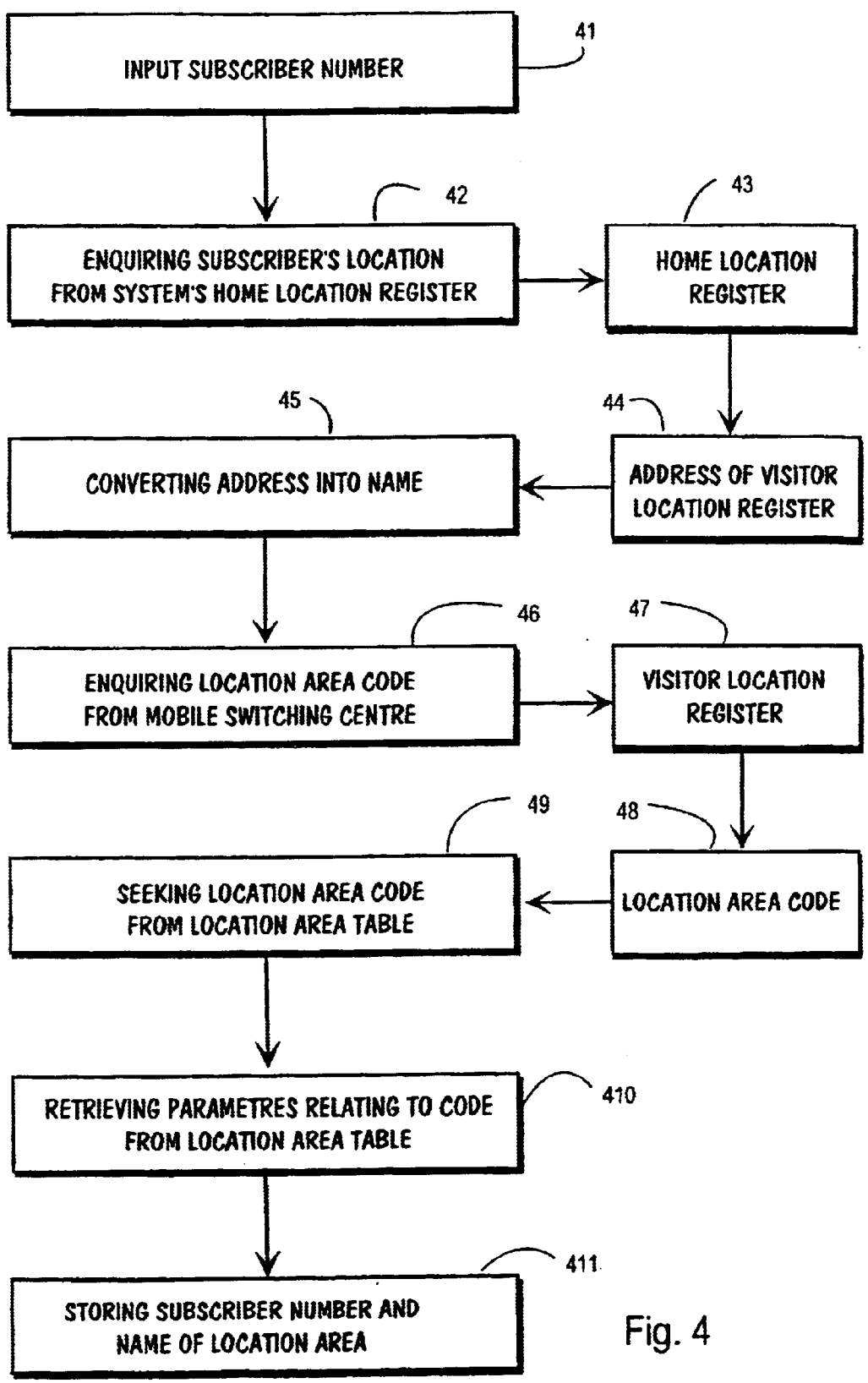
FIG. 4 is a reduced view of the inventive principle.

The basic steps of the tracing system according to the invention are shown in FIG. 4. After the subscriber connection number has been supplied, step 41, the tracing system enquires from the mobile telephone system's home location register where the subscriber is located, step 42. The home location register looks up the subscriber's location address, step 43, and sends it to the tracing system, step 44. The tracing system converts the address into such a visitor location register name which is known to the mobile switching centre, step 45, and then sends a location area enquiry to the mobile switching centre, where the concerned visitor location register is located, step 46. The enquiry contains the subscriber location number, and based on this the mobile switching centre seeks the code of that location area where the subscriber is located at that moment, step 47. The switching centre sends the location area code to the tracing system, step 48.

When the tracing system has received the location area code, it looks up the location area code from a location area table formed in advance, step 49. Then the parameters relating to the code are read. Since co-ordinates as such are not illustrative, the table also contains as a parameter in plain language such area information corresponding to the co-ordinates which makes it easier for the user to determine the subscriber's geographical location. The parameters are sought from the table, step 410, whereupon a record is formed which contains the desired parameters, at least the subscriber connection number and area information in plain language. The record is stored in a file, step 411.

With the aid of FIGS. 5 and 6 the formation of the location area table is described. The table is an important part of the invention and it is used to convert the location area information into a geographical place name which the user can understand. The location area table is formed beforehand from the "radio network information" input.

The radio network information needed in the input is obtained from the network planning system of the mobile telephone system. When planning the radio network, the network planning software is used for modelling the location of network cells, their number and field powers. The border of a cell is formed by an area where the field power has decreased below an acceptable value. Cell ID is given to each cell and location area codes LAC are given to the formed location areas. In addition, the co-ordinates of base transceiver stations are known.

Figure 1:
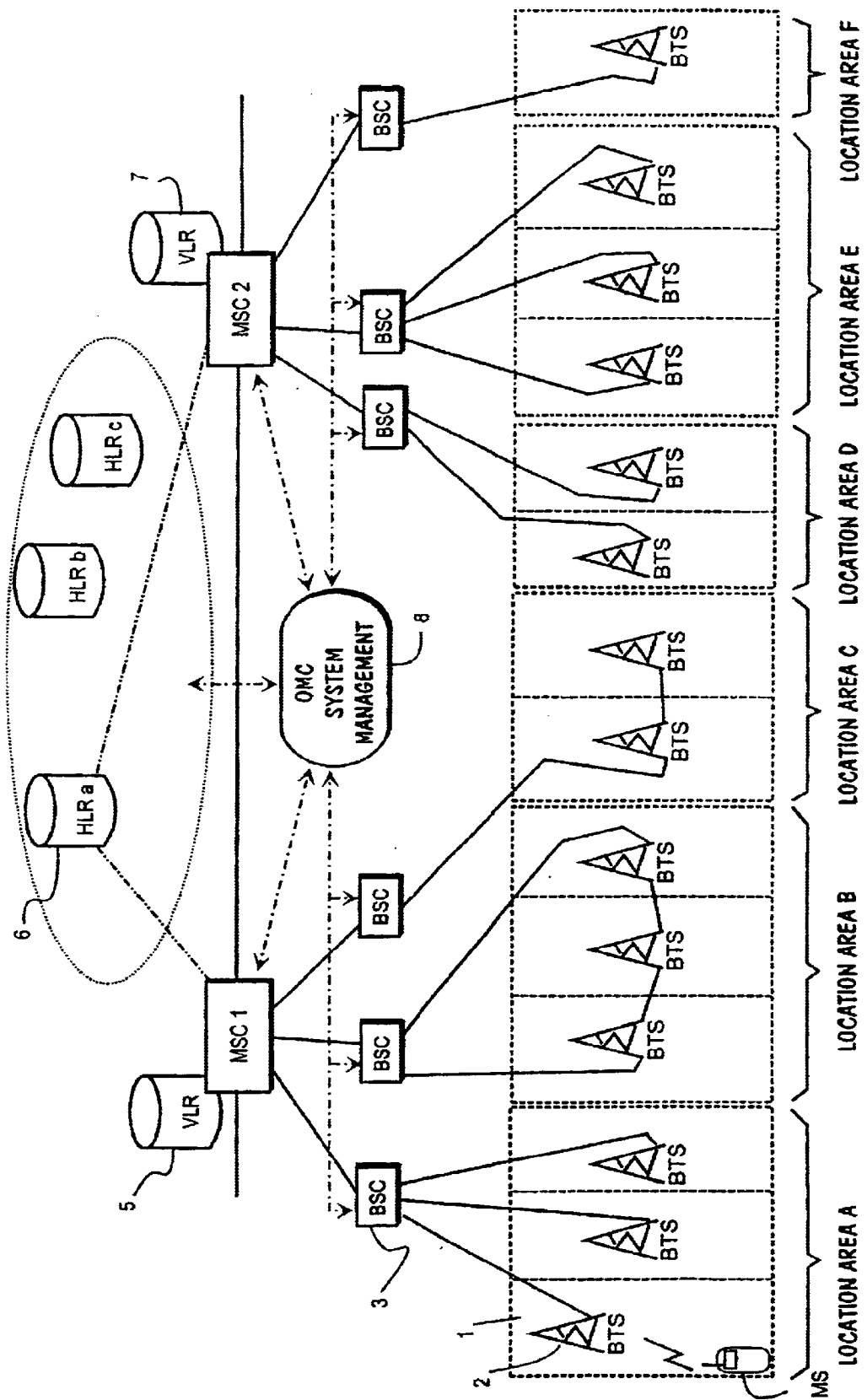
FIG. 1 shows a known mobile telephone system.
Figure 2:
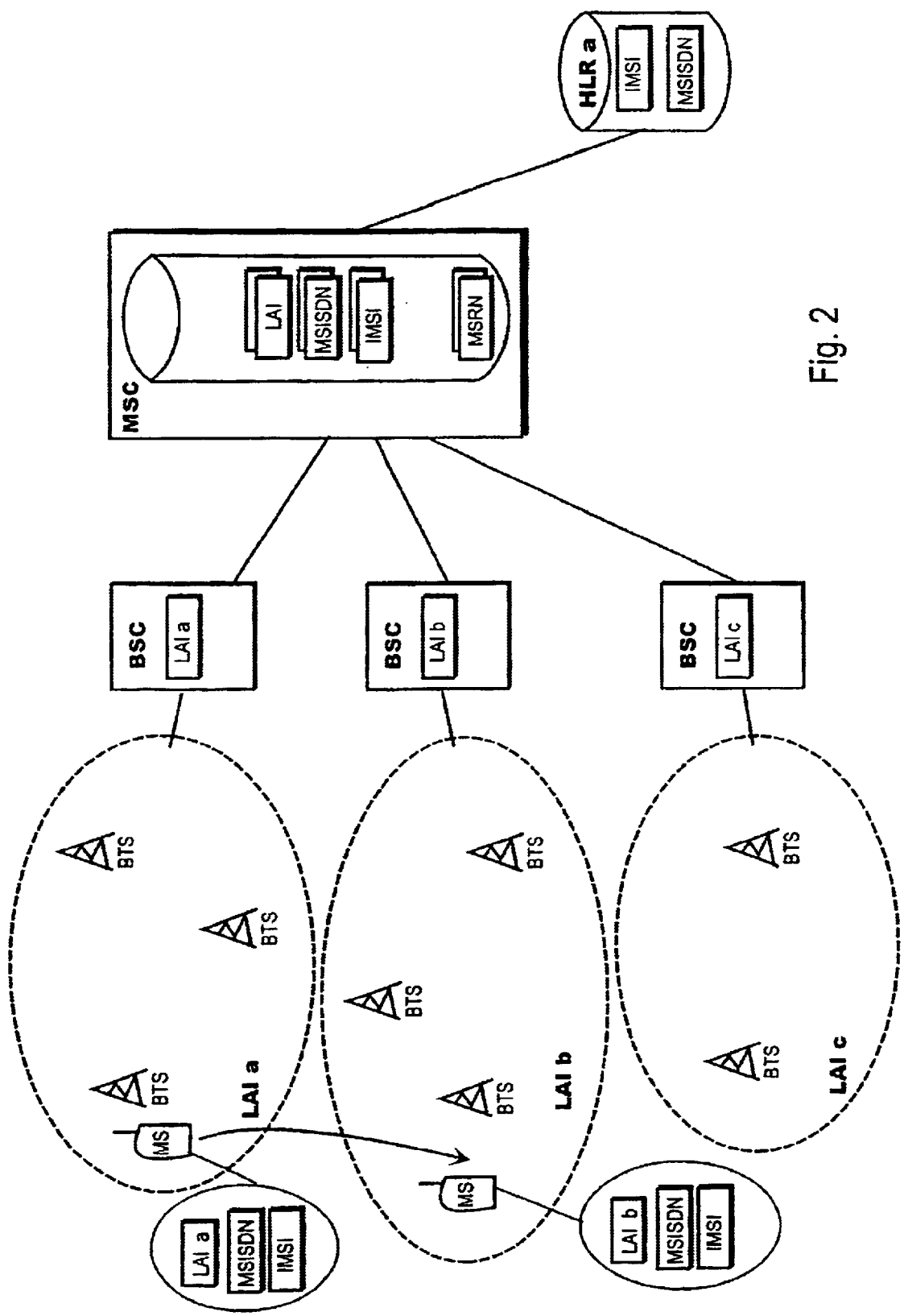
FIG. 2 shows some information maintained by the system in FIG. 1.
Figure 3A:
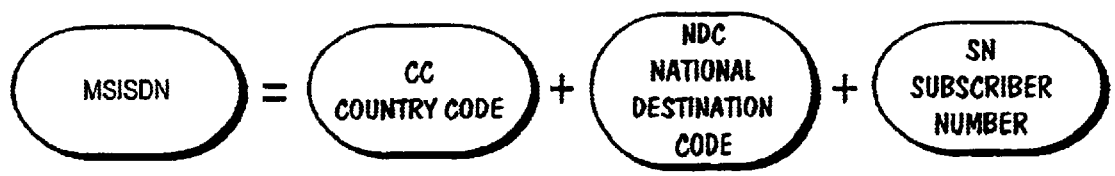
FIG. 3A illustrates the contents of the connection number.
Figure 3B:
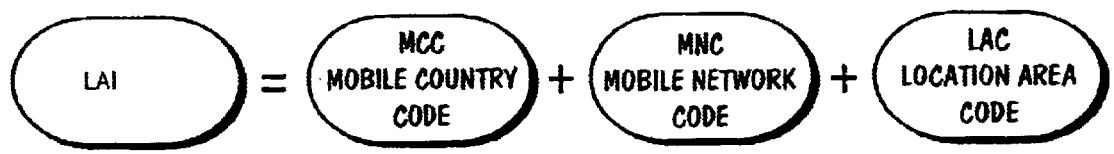
FIG. 3B illustrates the contents of the location area identity.

The network planning thus provides such a topographical view, the principle of which is as shown in the left part of FIG. 5 and which could show location area A of FIG. 1 as a map. The location area is formed by three cells, cells a, b and c, and the approximate borders of the cell areas are visible.

In accordance with FIG. 6, the tracing system searches the network planning system for information concerning the radio network in electronic form into the tracing system, e.g. through an LAN connection. The computer shown in the figure is one wherein the tracing system according to the invention will work. When the tracing system has received the network information, it takes on one location area at a time for processing, step 61. The geographical location area to be processed is converted by it into an equivalent location area, step 62. It may be e.g. a circular location area which is shown in the right part of FIG. 5 and which has midpoint co-ordinates X, Y and radius R. The formation of the equivalent area may be done in any suitable manner, e.g. by computing the centre of gravity co-ordinates X, Y of the real topographical location area and by giving such a radius that the area of the equivalent circle is equal to the area of the real location area.

When equivalent location areas have been computed for all location areas, a table is formed, in which location area code LAC and the centre of gravity co-ordinates X, Y and radius R of the equivalent area are located. Since from the user's viewpoint the location area code and the equivalent area information are not illustrative, a suitable illustrative name is given to each equivalent location area. This may be done in such a way that the equivalent location area is drawn on a map basis (the midpoint co-ordinates and the radius are known) and some descriptive name is chosen for the area, e.g. some illustrative familiar geographical name from the real place names of the area.

The resulting location area table is as shown in FIG. 7. Each line shows location area code LAC, equivalent area information X, Y and R and the geographical name. As an example, the place name Sipoo would correspond to code LAC 1 and the place name Porvoo to code LAC 2.

Figure 8:
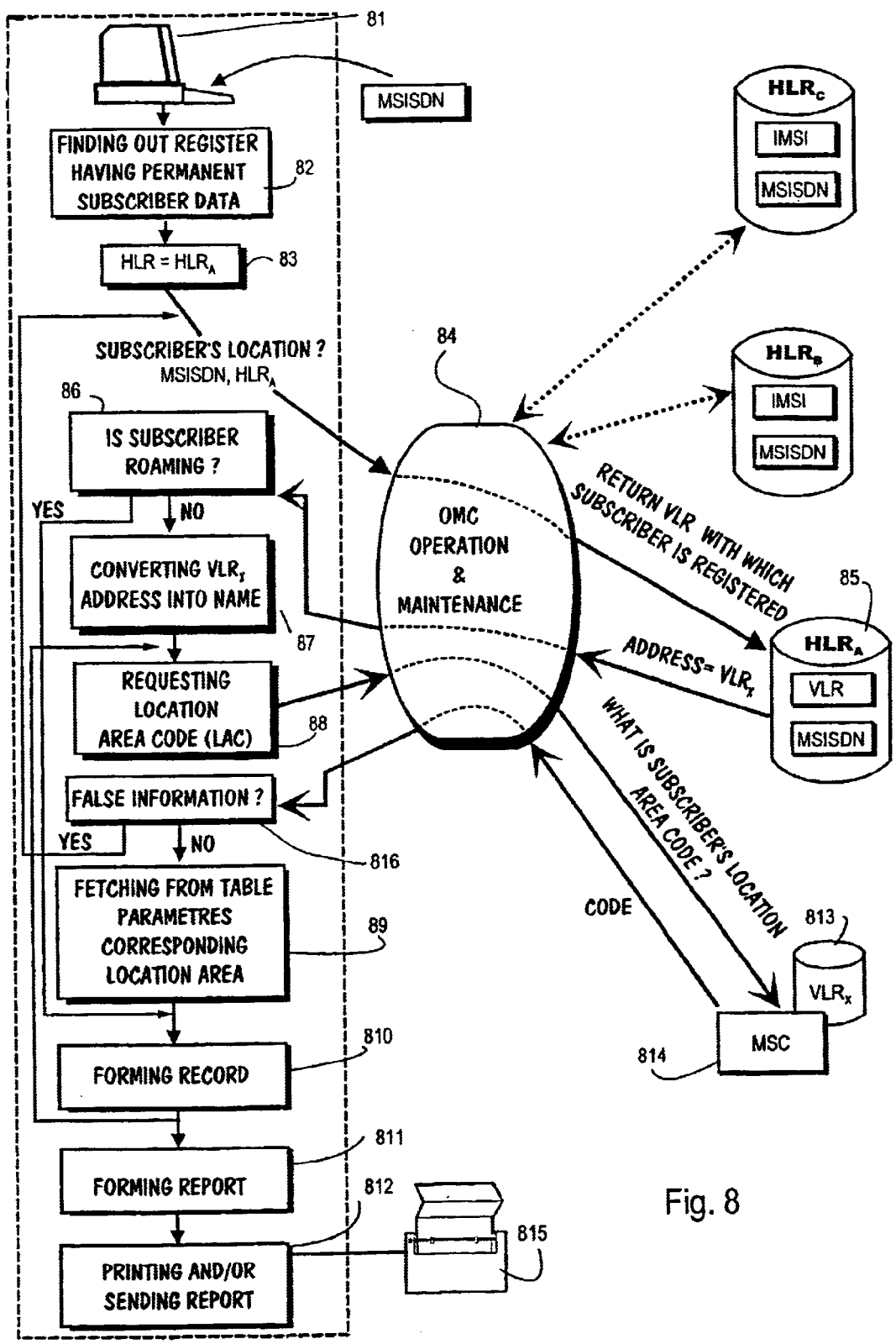
FIG. 8 shows steps of the system and the related network elements.

FIG. 8 shows the various functional steps of the tracing system and the relating network elements of the mobile telephone system. A table in accordance with FIG. 7 has already been formed at this stage. Three functional parts can be distinguished in the tracing system: 1) a first functional part which in response to the input connection number of the terminal asks the network management system to enquiry of the home location register which number in the subscriber information is the visitor location register number relating to the mobile station ISDN number (MSISDN), 2) a second functional part which in response to the visitor location register number asks the network management system to enquire of the stated visitor location register which is the location area identity in the subscriber's subscriber information, and 3) a third functional part, which in response to the location area identity searches the location area table for the parameters relating to the location area identity.

The following is a look at the events when tracing the movements of one subscriber. The mobile station ISDN number MSISDN is input to the tracing system by computer 81. The programme begins by finding out the home location register to whose subscriber information the MSISDN number belongs, step 82. It is assumed that the result of the search is that the subscriber information is in home location register $HLR_A$ marked with reference number 85, step 83. Then the tracing system sends an enquiry to the mobile telephone system's management system 84 asking where is the subscriber whose number is input MSISDN and whose home location register is $HLR_A$. The management system relays the enquiry further to $HLR_A$, which reads from its subscriber file that the concerned subscriber is registered with visitor location register $VLR_X$ marked with reference number 813. Home location register 85 returns to the management system the address of the subscriber's visitor location registers $VLR_X$, which the management system tells further to the tracing system. The received address is studied in step 86.

Like MSRN roaming number, the VLR address is a fixed address. It contains country code CC, operator code NDC and characters individualising the mobile switching centre relating to the visitor location register. Based on the country code of the address, the tracing system finds out whether the subscriber is abroad or in his own country. If the subscriber is abroad, it is not possible to determine his location more closely, but the operator is known from the operator code. Hereby the location information will be the name of that foreign country which has the CC country code and the operator's name. In the tracing system functions a jump is then made over the following steps and a record is formed of the obtained information, step 810.

If on the other hand the subscriber is in the operator's own network, it is possible to find out the subscriber's location by asking for the subscriber's location area identity LAI from mobile switching centre 814 relating to $VLR_X$. Since the network management system does not know the address of visitor location registers, the logical name of concerned $VLR_X$, which the network management system knows, is needed. This is why the tracing system has another table, an address conversion table, which performs the conversion VLR address→VLR logical name. The address conversion table contains the said conversion for each visitor location register of the operator. When the tracing system has received the $VLR_X$ number from the network management system, it converts it into the concerned register's logical name, step 87. Then it sends to management system 84 a request to ask for location area code LAC from that visitor location register 813, which carries the logical name obtained in step 87, step 88.

The management system sends an enquiry "which is the location area of the terminal having this subscriber connection number in the VLR" and receives centre 814 an answer containing sought location area code LAC.

Management system 84 sends the received answer to the tracing system. If it so happens that the subscriber has already left the VLR area and is thus no longer in this register, the VLR will give "false information" in reply. The tracing system notices the error message, step 816, and asks the management system to enquire of $HLR_A$ where the subscriber is. Upon receipt of the information the function proceeds in the manner described above. If no error message is received, but location area code LAC is received, then the tracing system will search the location area table shown in FIG. 7 to find out which parameters correspond with the stated LAC code, step 89. Then a record is formed in which the desired parameters from the table are placed along with the time of day and the date, whereby the location area information has been obtained, step 810.

If the tracing is continuous, the function returns to the beginning and a new enquiry is sent to the management system. In order to reduce the load on the management connections of the management system it is preferable to perform continuous tracing periodically, as an enquiry taking place at intervals of e.g. 15 minutes.

Finally, a report is set up containing the results of one or more enquiries, step 815. The report may be printed out by printer 815 or it may be sent in electronic form to the party ordering the tracing. The transmission may be a message service used in the network (in GSM a Short Message Service, SMS) or some other protected way of transmission.

The report can be made either as a history report, whereby it contains enquiries made at certain intervals, starting from a given moment of time and ending at a given moment of time. The report may also be a status report, which is an answer to the question "where is this subscriber now?". The report may also be set up only when the tracing system has noticed that the location area code has changed. The requested information may be stored in the report, such as the location of the terminal at the moment of enquiry, the co-ordinates and radius of the equivalent area, the date and time of day, the name of the area and, in addition, the event. The status report can be sent to the ordering party only when the location area is changed. Hereby enquiries are made at a standard frequency, but the result is stated only when a change occurs.

In the example shown in FIG. 8 the process started by an input of the MSISDN number. It is preferable in practice to input different initial parameters in the same context, such as at least the length of the tracing time, the enquiry frequency and possibly also the form and contents of the report. In fact, any information of the location area table of FIG. 7 may be placed in the report. In some cases there could be a need to outline the area wherein the subscriber is located. This is possible by drawing a circle on a map according to the given radius and midpoint co-ordinates.

Figure 9:
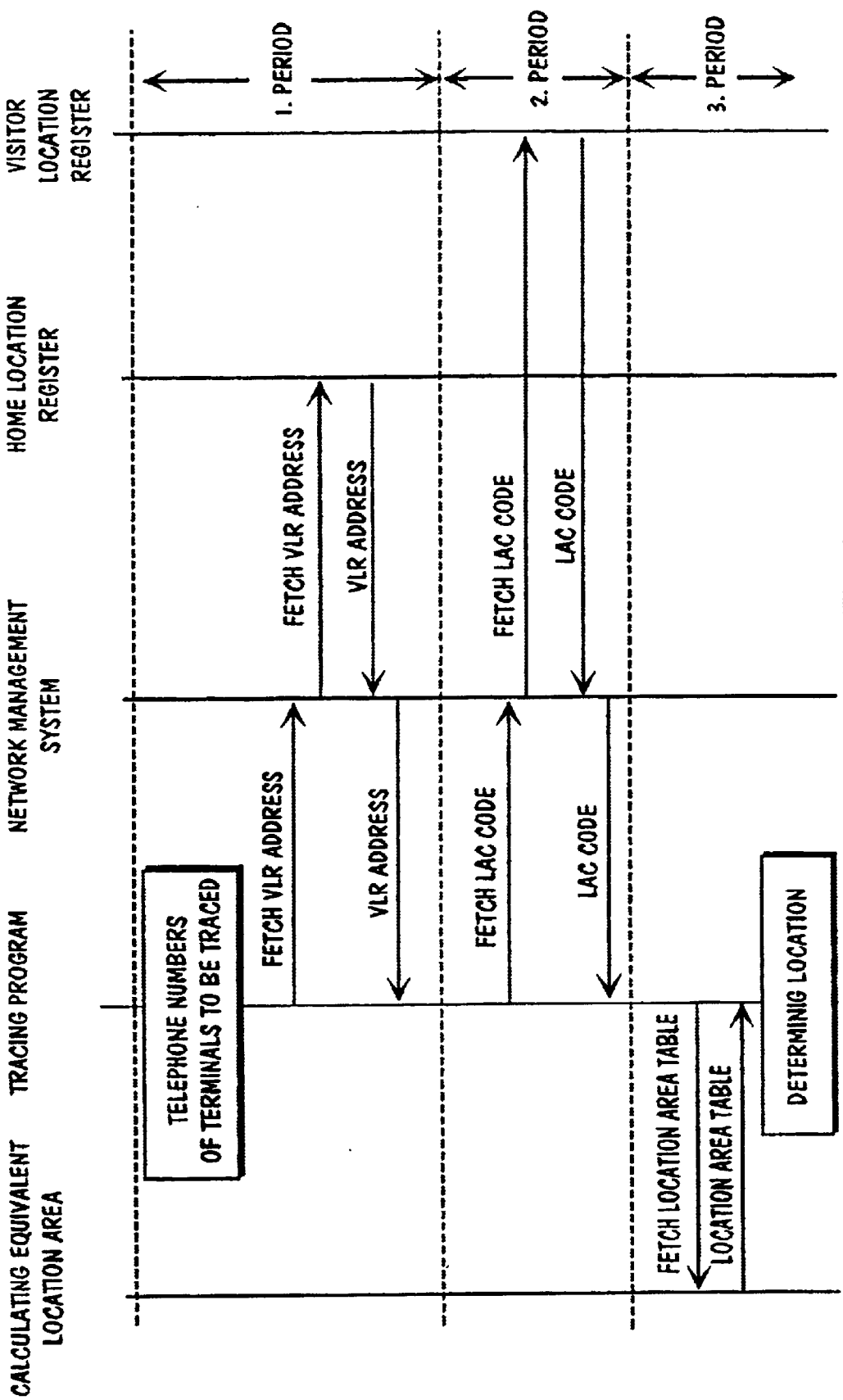
FIG. 9 shows a signalling diagram of the function.

FIG. 9 is a signalling diagram of messages in the process of FIG. 8, that is, between the network elements and the tracing system. As can be seen, the tracing system is connected to the mobile communications network by way of the network management system. The user interface of the network management system is Man Machine Language MML, so the tracing system can be connected to the management system using the same interface. It can easily be seen in the figure that the operation can be divided into three periods: in the first period the traced subscriber's location, that is, the address of the visitor location register, is sought, in the second period location area information is sought from the visitor location register of the place of location, and in the third period parameters relating to the location area information is sought from a table set up in advance.

If the mobile communications system is a GSM system, then the first step in FIG. 9 can be replaced by using MAP signalling of the mobile telephone network by sending to the HLR register a "Send Routing Info for SMS" message at the MAP/C interface. The HLR replies with a "Send Routing Info for SMS Result" message containing the subscriber's VLR number and the IMSI number. Since the IMSI number is learnt in this way, it is possible also to trace foreign connections roaming in the network.

The tracing system in accordance with the invention includes a computer, wherein the software carrying out the functions is located. It is preferable for the computer to be physically located on the same premises as the network management system. The computer is hereby in a local network connection with the work stations of the network management system. The computer is also in a local network connection with the network planning system, from which network information is obtained in electronic form.

What is claimed is:

1. Method of determination of the location area of a terminal in a cellular mobile telephone network including
   at least one home location register (HLR) wherein permanent subscriber information is stored, including the subscriber number (MSISDN) of the terminal,
   at least one mobile switching centre (MSC) and a related visitor location register (VLR), wherein subscriber information about terminals located in a switching centre area comprising of several location areas is temporarily stored, whereby the subscriber information also contains an identity of that traffic area wherein each terminal is located,
   a network management system which can make enquiries to the home location register and to the visitor location register,
   a network planning system storing the geographical location information of cell areas for each location area and location area identity information, wherein:
   location area information is sought from the network planning system,
   using the location area information, a permanent location area table is formed, wherein desired parameters are added to the identity of each location area, and that in the determination of the location area of the terminal:
   the network management system is requested to ask the home location register which is the visitor location register number in the subscriber information of the subscriber number (MSISDN) of the terminal,
   the network management system is requested to ask the stated visitor location register which is the location area identity in the subscriber's subscriber information,
   the parameters relating to the location area identity are sought from the location area table.

2. Method as defined in claim 1, wherein
   from the cell areas of the location area an equivalent location area is formed whose midpoint is the centre of gravity of the cell areas and whose area is the area of the cell areas,
   the equivalent location area is placed as a parameter in the location area table.

3. Method as defined in claim 1, wherein
   a real geographical name is given to the equivalent location area and the name is placed as a parameter in the location area table.

4. Method as defined in claim 1, wherein the date and time of day are placed as a parameter in the location area table.

5. Method as defined in claim 1, wherein the visitor location register number obtained from the home location register is converted into a register name and the network management system is requested to make this enquiry of a visitor location register carrying this name.

6. Method as defined in claim 1, wherein the network management system is requested repeatedly to ask for the location area identity and at a predetermined frequency.

7. Method as defined in claim 1, wherein in response to an error message sent by the home location register, the network management system is requested to make a new enquiry to the home location register.

8. Method as defined in claim 6, wherein the parameters relating to the location area identity are placed as a record and a tracing report is formed of successive records.

9. Method as defined in claim 8, wherein a record is placed in the tracing report only when there is a change in the subscriber's location area identity.

10. Method as defined in claim 8, wherein the network management system is requested to ask the visitor location register also for other subscriber information and this information is placed in the report.

11. Method as defined in claim 1, wherein only the country code is placed in the record of the tracing report, if the terminal is a roaming subscriber in the network of a foreign operator.

12. Method as defined in claim 6, wherein in response to an error message sent by the home location register, the network management system is requested to make a new enquiry to the home location register.

13. A tracing system for determination of the location area of a terminal in a cellular mobile telephone network including
   at least one home location register (HLR) wherein permanent subscriber information is stored, including the subscriber number (MSISDN) of the terminal,
   at least one mobile switching centre (MSC) and the related visitor location register (VLR) wherein subscriber information on terminals located in a switching centre area including several location areas is temporarily stored, whereby the subscriber information also contains the identity of that traffic area wherein each terminal is located, a network management system which may make enquiries to the home location register and to the visitor location register, a network planning system storing the geographical location information of cell areas for each location area and the location area identity information, wherein the tracing system is in communication connection with the network management system and it includes:

a location area table containing the location area identity information and as parameters relating to this at least the geographical name given to the location area, a first functional part, which in response to the input connection number of the terminal requests of the network management system to ask the home location register which in the subscriber information is the visitor location register number relating to the subscriber number (MSISDN), a second functional part, which in response to the visitor location register number requests of the network management system to ask the stated visitor location register which is the location area identity in the subscriber's subscriber information, a third functional part, which in response to the location area identity searches the location area table for the parameters relating to the location area identity.

14. Tracing system as defined in claim 13, wherein in that the location area table contains the identity of each location area and, in addition, for each identity:

an equivalent location area whose midpoint co-ordinates are the centre of gravity of the real location area, a set of parameters.

15. Tracing system as defined in claim 13, wherein in response to the visitor location register number given by the first functional part, the second functional part converts the register number into a register name and requests of the network management system to make an enquiry of a visitor location register of this name.

16. Tracing system as defined in claim 13, wherein the second functional part requests of the network management system to ask repeatedly for the location area identity and at a given frequency.

17. Tracing system as defined in claim 13, wherein in response to an error message sent by the home location register, the first functional part requests of the network management system to make a new enquiry to the home location register.

18. Tracing system as defined in claim 13, wherein the third functional part places the parameters relating to the location area identity as a record and forms a tracing report of successive records.

19. Tracing system as defined in claim 13, wherein it works in a general-purpose computer and it is in a local network connection with works stations of the network management system.

* * * * *